US008642964B2

(12) United States Patent
Cundiff et al.

(10) Patent No.: US 8,642,964 B2
(45) Date of Patent: Feb. 4, 2014

(54) HIGH REPETITION RATE PHOTOCONDUCTIVE TERAHERTZ EMITTER USING A RADIO FREQUENCY BIAS

(75) Inventors: Steven Cundiff, Boulder, CO (US); Jared Wahlstrand, Silver Spring, MD (US); Haipeng Zhang, Longmont, CO (US); Soobong Choi, Boulder, CO (US)

(73) Assignee: The United States of America, as represented by the Secretary of Commerce, NIST, Washington, DC (US)

(*) Notice: Subject to any disclaimer, the term of this patent is extended or adjusted under 35 U.S.C. 154(b) by 163 days.

(21) Appl. No.: 13/214,685

(22) Filed: Aug. 22, 2011

(65) Prior Publication Data
US 2012/0126122 A1 May 24, 2012

Related U.S. Application Data

(60) Provisional application No. 61/378,559, filed on Aug. 31, 2010.

(51) Int. Cl.
*G01J 5/20* (2006.01)
(52) U.S. Cl.
USPC .................. 250/338.4; 250/339.07; 250/340
(58) Field of Classification Search
USPC .......... 250/338.4, 339.07, 504 R, 340, 493.1, 250/496.1; 483/25; 372/18, 24, 25
See application file for complete search history.

(56) References Cited

U.S. PATENT DOCUMENTS

| 5,729,017 | A  | * | 3/1998  | Brener et al. ............. 250/338.1 |
| 5,894,125 | A  | * | 4/1999  | Brener et al. ................ 250/330 |
| 6,476,596 | B1 | * | 11/2002 | Wraback et al. .......... 250/338.4 |
| 7,113,534 | B2 | * | 9/2006  | Unterrainer et al. ........... 372/99 |
| 7,498,593 | B2 | * | 3/2009  | Shen et al. ................ 250/504 R |
| 7,835,499 | B2 | * | 11/2010 | Yu et al. ...................... 378/119 |
| 7,929,580 | B2 | * | 4/2011  | Moeller ......................... 372/18 |
| 7,947,942 | B2 | * | 5/2011  | Ouchi ........................ 250/214.1 |
| 8,263,937 | B2 | * | 9/2012  | Itsuji ............................ 250/340 |
| 2002/0196444 | A1 | * | 12/2002 | Nymen et al. ............... 356/460 |
| 2004/0017833 | A1 | * | 1/2004  | Cundiff et al. ................. 372/18 |
| 2006/0214107 | A1 | * | 9/2006  | Mueller ..................... 250/341.8 |

(Continued)

OTHER PUBLICATIONS

Xuemei Zheng, Ying Xu, Roman Sobolewski, Roman Adam, Martin Mikulics, Michael Siegel, and Peter Kordos. Title:Femtosecond response of a free-standing LT-GaAs photoconductive switch, Date: Mar. 20, 2003, Publisher: Applied Optics.*

(Continued)

*Primary Examiner* — David Porta
*Assistant Examiner* — Taeho Jo
(74) *Attorney, Agent, or Firm* — Daphne L. Burton; Burton IP Law Group

(57) ABSTRACT

A terahertz generation system that emits pulsed THz radiation and incorporates a rapidly oscillating, high voltage bias across electrodes insulated from a photoconductive material. The system includes an ultrafast optical pulse source configured to generate an optical pulse having a duration between about ten picoseconds and ten femtoseconds, the pulse further having a repetition rate of about one megahertz or higher. The system further includes a photoconductor configured to receive the optical pulse from the ultrafast optical pulse source and to generate a terahertz frequency pulse, the photoconductor having insulated electrodes. The system still further includes a radio frequency generator configured to apply an electric field to the photoconductor via the insulated electrodes.

22 Claims, 7 Drawing Sheets

(56) References Cited

U.S. PATENT DOCUMENTS

| | | | |
|---|---|---|---|
| 2009/0200472 A1* | 8/2009 | Gregory | 250/339.07 |
| 2009/0225312 A1* | 9/2009 | Formanek et al. | 356/326 |
| 2010/0264312 A1* | 10/2010 | Koshelev et al. | 250/338.4 |
| 2010/0276594 A1* | 11/2010 | Rafailov et al. | 250/338.4 |
| 2010/0282968 A1* | 11/2010 | Jin et al. | 250/338.4 |
| 2010/0314545 A1* | 12/2010 | Logan et al. | 250/339.07 |
| 2011/0080329 A1* | 4/2011 | Nagel | 343/770 |

OTHER PUBLICATIONS

Author: w. Sha, T. B. Norris, J. W. Burm, D. Woodard, and W. J. Schaff, Title:New coherent detector for terahertz radiation based on excitonic electroabsorption, Date:Oct. 12, 1992, Publisher: Appl. Physics.*

K. Reimann, "Table-top sources of ulatrshort THz pulses," Rep. Prog. Phys. 70, 1597-1632 (2007).

S.E. Ralph and D. Grischkowsky, "Trap-enhanced electric fields in semi-insulators: The role of electrical and optical carrier injection," Appl. Phys. Lett. 59, 1972-1974 (1991).

D.S. Kim and D.S. Citrin, "Coulomb and radiation screening in photoconductive terahertz sources," Appl. Phys. Lett. 88, 161117 (2006).

J.H. Kim, A. Polley and S.E. Ralph, "Efficient photoconductive terahertz source using line excitation," Opt. Lett. 30, 2490-2492 (2005).

D.S. Kim and D.S. Citrin, "Efficient terahertz generation using trap-enhanced fields in semi-insulating photoconductors by spatially broadened excitation," J. Appl.Phys.101, 053105 (2007).

G. Zhao, R.N. Schouten, N. van der Valk, W.T. Wenckebach and P.C.M. Planken, "Dsign and performance of a THz emission and detection setup based on a semi-insulating GaAs emitter," Rev. Sci. Inst. 73, 1715-1719 (2002).

D.A. Turton, G.H. Welsh, J.J. Carey, G.D. Reid, G.S. Beddard and K. Wynne, "Alternating high-voltage biasing for terahertz large-area photoconductive emitters," Rev. Sci. Inst. 77, 083111 (2006).

J.K. Wahlstrand, H. Zhang, and S.T. Cundiff, "Uniform-field transverse electroreflectance using a mode-locked laser and a radio-frequency bias," Appl. Phys, Lett. 966, 101104 (2010).

A. Dreyhaput, S. Winnerl, M. Helm and T. Dekorsy, "Optimum excitation conditions for the gneration fo high-electric-field terahertz radiation from an oscillator-driven photoconductive device," Opt. Lett. 31, 1546-1548 (2006).

RA Forman, DE Aspnes, and M Cardona, J. Phys. Chem. Solids 31, 227 (1970).

\* cited by examiner

HIGH REPETITION RATE PHOTOCONDUCTIVE TERAHERTZ EMITTER USING A RADIO FREQUENCY BIAS

CROSS-REFERENCE TO RELATED APPLICATIONS

The present application claims priority to provisional application Ser. No. 61/378,559, filed on or about Aug. 31, 2010, entitled "High Repetition Rate Photoconductive Terahertz Emitter Using a Radio Frequency Bias" naming the same inventors as in the present application. The contents of this provisional application are incorporated by reference, the same as if fully set forth.

STATEMENT REGARDING FEDERALLY SPONSORED RESEARCH/DEVELOPMENT

The subject matter of this patent application was invented under the support of a United States Government contract. Accordingly, the United States Government may manufacture and use the invention for governmental purposes without the payment of any royalties.

BACKGROUND OF THE INVENTION

1. Field of Invention

The present disclosure relates to terahertz generation with lasers and, more particularly, to a high repetition rate terahertz generation system using a radio frequency bias.

2. Description of Related Art

Terahertz (THz) radiation technology is becoming increasingly popular. It has a number of applications in sensing and imaging. The power of THz radiation generated using photoconductors is also useful. It could be the basis for important advances in homeland security, defense and health care.

The term "terahertz radiation" may be used to refer to electromagnetic radiation falling in the very far- to mid-infrared spectral range, corresponding to frequencies ranging from approximately 100,000,000,000 hertz (0.1 Terahertz) to 10,000,000,000,000 (10 THz), although even higher frequencies may be included if the generation method is also used to produce frequencies in this range. The production of coherent THz radiation has proven to be challenging because the frequencies may be too high to be generated with microwave electronics. However, the frequencies may also be too low to use standard optical techniques and sources such as lasers. Until quantum cascade lasers were developed, it was difficult to build a THz laser with good transitions.

With the advent of ultrafast lasers, it was possible to generate few-cycle THz pulses. Such pulses have been used widely in connection with terahertz time domain spectroscopy (THz-TDS). The detection of the pulse can be coherent, for example with electro-optic crystals and a short probe pulse, thus enabling extraction of amplitude and phase information. This may be a powerful spectroscopic technique in applications associated with chemistry, biology and homeland security. However, it should be noted that THz generation by optical pulses may be inefficient. The power efficiency may be as small as $1 \times 10^{-3}$ or lower.

Amplified lasers have been used to address power efficiency issues. Strong THz pulses may be produced with amplified lasers and low repetition rates. However, amplified lasers may be expensive. There is a need for a less expensive, practical source of THz pulses.

One method of producing ultrashort THz pulses was to illuminate a biased semiconductor with ultrashort optical pulses, produced, for example, by a mode-locked laser. The photocarriers may be accelerated by the electric field from the bias, and the changing current may result in radiation. Because the carriers may be produced on a sub-picosecond time scale, the radiated pulse may be referred to as a THz frequency pulse.

Some early prior art photoconductive emitters were referred to as Auston or photoconductive switches and were used as sources of ultrashort THz pulses. Another common early prior art technique of producing ultrashort THz pulses was using difference frequency generation (DFG), also known as optical rectification, in nonlinear media. Using the Auston switches, a single cycle pulse may be generated with no need for phase-matching. However, using a DFG technique, phase-matching may be necessary.

More recently, prior art photoconductive emitters include Ti:sapphire oscillator laser sources. These include a semi-insulating wafer of gallium-arsenide with attached electrodes composed of either metal or silver paint. The gap between the electrodes may range in width from a few microns to hundreds of microns or more. High voltage may be applied to the electrodes, either modulated in order to facilitate lock-in detection, or constant in order to get the THz average power.

Using a narrower gap between electrodes, the same field may be obtained using a smaller bias voltage. It has been found that the behavior of impurities in semi-insulating gallium arsenide (GaAs) results in electric field distribution that is different from that expected for a perfect dielectric. A good portion of the voltage drop may occur within a few microns of the positively charged electrode. Therefore, the THz power may depend strongly upon the location where the laser spot is focused with respect to the electrodes.

On the other hand, as disclosed in the prior art, a tightly focused laser spot may result in more ultrafast screening for a given laser power, thus limiting the THz emission. Pulses having a fluence larger than 50 microjoules per square centimeter ($cm^2$) may not produce much more than weaker pulses in terahertz because of these screening effects. As the prior art has shown, these emitters use trap-enhanced fields, and the optimal beam shape may be elongated along the positive electrode so that screening effects are lessened. Trap-enhanced electric fields may make photoconductive switched extremely efficient at low incident optical power, but the THz generated may saturate rapidly with increasing excitation power.

For a beam having a waist below about twenty microns (20 μms), a key limitation on output power may be ultrafast screening of the applied field by photo-injected carriers. A line focus may be a desirable way of exciting these emitters since the carrier density may be lowered compared with a point focus, thus lessening the Coulomb screening. Large gains may be possible if the electric field is spread over a wider area of the sample. With high voltage bias and larger electrode spacing, high power "semi-large" area emitters have been achieved using semi-insulating gallium arsenide at about 100 MHz repetition rates.

There is a need for a terahertz generation system that does not incorporate emitters that use trap-enhanced fields. There is further a need for a terahertz generation system for which the electric field may be spread over a wider area of the sample.

BRIEF SUMMARY OF DISCLOSURE

The present disclosure addresses the needs described above by providing a THz generation system that incorporates a less expensive, practical source of THz pulses. This source is an unamplified mode-locked laser oscillator with a repetition rate of 25-1000 MHz. The terahertz generation system comprises an ultrafast optical pulse source configured to generate an ultrafast optical pulse. The system further includes a photoconductor configured to receive the optical pulse from the ultrafast optical pulse source and to generate a terahertz frequency pulse. Finally, the terahertz generation system includes a radio frequency generator configured to apply an electric field to the photoconductor via electrodes, said electrodes being insulated from the photoconductor.

These, as well as other objects, features and benefits will now become clear from a review of the following detailed description of illustrative embodiments and the accompanying drawings.

DETAILED DESCRIPTION OF THE DISCLOSURE

Figure 1A:
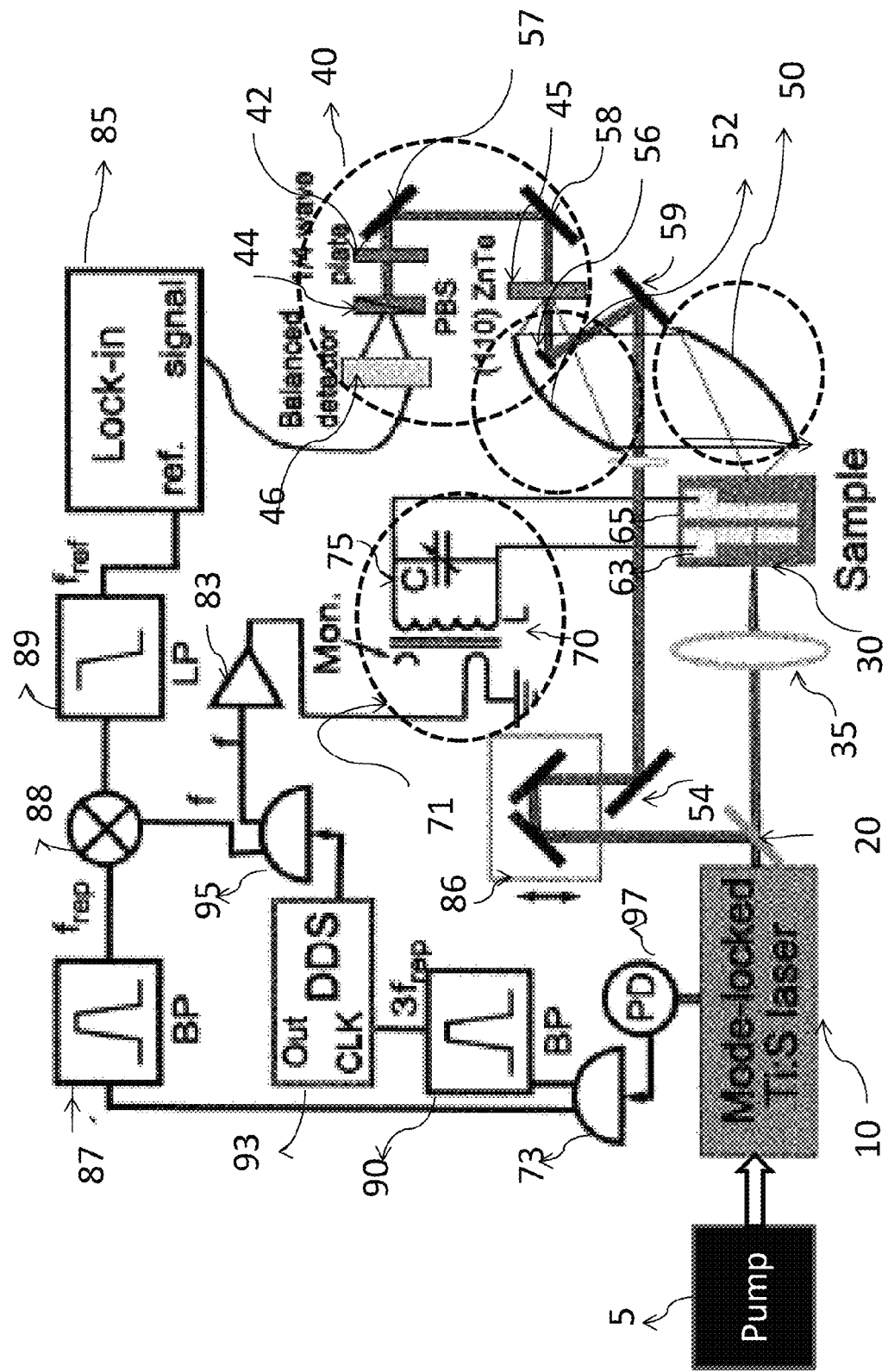
FIG. 1A is a terahertz generation system in accordance with one embodiment of the present disclosure.

The present disclosure provides a terahertz generation system that incorporates use of an oscillator. While the prior art may incorporate use of a DC bias to provide the electric field in the emitter, the THz generation system of the present disclosure incorporates a rapidly oscillating bias with a frequency near a repetition rate (25-1000 MHz) of the laser source. Using the terahertz generation and detection system of the present disclosure, the THz emission may be modulated at the frequency difference between the repetition rate and the bias oscillation frequency. The frequency difference may be set in the audio range of 1-100 kHz, which may be easily handled by electronics, including lock-in amplifiers. The high voltage bias may be enhanced using a resonant LC circuit.

Using an oscillating bias may have benefits over devices using trap-enhanced fields. An oscillating bias may help to spread the region of high electric field over a wider area. This may allow the use of a larger laser spot, thus increasing the pulse energy that can be used before the process is saturated by ultrafast screening processes.

Another advantage of using an oscillating bias over prior art devices incorporating trap-enhanced fields is that a larger region of emissions may result in radiated terahertz that is better confined to the forward direction. On the other hand, a small spot may result in terahertz emission in a dipole field pattern. Systems using a small spot may require a silicon hemisphere to collimate the field after emission, resulting in more complexity and loss.

Benefits may also be seen for the present terahertz generation system as compared to prior art devices incorporating pulsed high voltage sources. For example, the present system may be more robust and have a lower voltage. Conversely, emitters using pulsed high voltage sources may be susceptible to damage due to electrical breakdown, thermal effects and electromigration over time.

The present terahertz generation system may also have other benefits over the prior art. For example, the present system may be less susceptible to pickup from bias. Pulsed high voltage sources may produce electromagnetic noise that can introduce data artifacts because of the sensitivity of photodetectors and the lock-in amplifier to the electromagnetic noise. Although the present terahertz generation system may produce noise at the modulation frequency, it may be far less susceptible to pickup from bias. The heterodyne technique of the present terahertz generation system detects at the frequency difference between the modulation frequency and the laser repetition rate.

Another benefit of the present terahertz generation system is that high voltage at radio frequencies is less dangerous than high voltage that is constant or modulated at low frequencies. Using the present system, one would not generally get a shock from high voltage radio frequency. There may a lag time in driving ions through the membrane of nerve cells. The resonant electronics in the present terahertz generation system that generate the high voltage in the present system is passive, and may not require a source of constant high voltage at all.

Using the terahertz generation system of the present disclosure, an alternative biasing technique results in a uniform electric field across the sample. The present system also uses a simple electrode structure and does not require electrical contact between the electrodes and the sample.

In lieu of a constant DC bias, the present terahertz generation system incorporates rapidly oscillates the bias at a frequency near the laser repetition rate. An oscillating bias has been used at lower repetition rates corresponding to amplified laser systems. However, it may not have been previously scaled up to the repetition rates of Ti:sapphire or fiber mode-locked laser oscillators. The present system incorporates electrodes that may be insulated from the GaAs sample. Accordingly, trap enhanced fields may not form.

The frequency, f, of the applied bias should be high compared to $1/\tau_d$, where $\tau_d$ represents the dielectric relaxation time of the sample. The dielectric relaxation time may characterize the time it takes for electrons in a material to move to screen an applied electric field. The dielectric time $\tau_d = \epsilon \rho$ where $\epsilon$ is the dielectric constant of the sample and $\tau$ is its resistivity. For an intrinsic semiconductor, the resistivity may be inversely proportional to the optical power. For the conditions and materials used in the present terahertz generation system, $\tau_d$ is approximately 1 microsecond. Thus f should be higher than a few megahertz.

Moreover, significant heating may not occur from electrical conduction due to bias. The uniform electric fields of the present system may be generated using a contactless technique (about 30 kV/cm) as measured by electroreflectance and may not be as strong as the large, but localized trap-enhanced fields seen in samples with DC bias (about 200kV/cm). The larger spot size, however, made possible by the radio frequency technique may result in a higher saturation threshold for the terahertz power emitted. The terahertz signal may be modulated at the difference between the radio frequency bias frequency and the laser repetition rate, and that difference may be set at will. A modulation frequency in the kHz frequency range may be used with the present system where lock-in amplifiers may have optimal performance.

Referring now to FIG. 1A, illustrated is a terahertz generation and detection system in accordance with one embodiment of the present disclosure. Light source 10 may be a mode-locked Ti:sapphire laser with a spectrum centered at about 830 nm, a full width half maximum of 50 nm and a repetition rate of about 89 MHz. For purposes of the present application, high repetition rate depends on the properties of the pertinent sample as discussed above in paragraph 0033; however, it may be generally defined as a repetition rate of about 1 MHz or above.

The laser beam may be split into two by a beam splitter 20. One output of the beam splitter 20 may be used to pump the sample 30, which is a photoconductive emitter. It does so when lens 35 focuses on the optical pulse train on the sample 30. The size of the laser beam spot on the sample 30 may be matched to the gap between electrodes 63, 65. The sample 30 may convert optical pulses (with a center frequency in the range of hundreds of terahertz) to pulses in the terahertz frequency range (with a center frequency of about 1 terahertz). The sample 30 may effectively take the intensity envelope of the optical pulse and create a pulse with an electrical field that tracks the intensity of the envelope. Since the pulse duration may last about one picosecond, this pulse may correspond to an electric field with a spectrum around one terahertz.

The electrodes 63, 65 may be insulated from the sample 30, rather than being in electrical contact as taught by the prior art. This insulation may avoid the trap-enhanced fields that were drawbacks in prior art photoconductive emitter sample designs. In addition, the insulation may prevent the electrons that are created by the incident light pulses from being swept out of the photoconductor 30 into the electrodes 63, 65. The electrons created by the light may screen the applied bias field and thus result in no electric field. By oscillating the bias field at a high frequency, this drawback may be addressed so that the electrons cannot move fast enough to cancel or screen the electric field out.

The other output from the beam splitter 20 may be used in a standard THz detection subsystem. In the present embodiment, the detection subsystem is an electro-optic sampling subsystem 40 having a one millimeter (1 mm) thick ZnTe (110) crystal 45 to measure the emitted THz pulse. In lieu of an electro-optic sampling subsystem, other technologies, such as an unbiased photoconductive switch, can be used for the detection subsystem. In the present embodiment, the ZnTe crystal 45 is an electro-optic crystal. It may have an index of refraction that depends on the electric field applied to it. If the crystal 45, electric field and light polarization are properly oriented, then the polarization of the light may be altered in a way that depends on the strength of the applied electric field. The incident light may be linearly polarized and may become elliptically polarized if there is an applied electric field. The degree of ellipticity may be proportional to the electric field strength. As the delay between the light pulse and the THz pulse is varied, different parts of the THz pulse may be sampled.

The electro-optic sampling (or detection) subsystem 40 may also include a ¼ waveplate 42 that converts the elliptically polarized light to linearly polarized light, but with a polarization direction that is rotated. The degree of rotation may correspond to the degree of ellipticity of the input light. The electro-optic sampling subsystem 40 may also include a Wollaston prism 44, which is a polarizing beam splitter. This prism 44 may direct orthogonal linear polarizations into two different output directions (at smaller than a 90 degree angle). It may be adjusted, along with the waveplate 42, so that when no electric field is present at the ZnTe crystal 45, the light in the two output directions is approximately equal in intensity. Therefore, any electric field present at the ZnTe crystal 45 may cause the two output intensities to become unequal.

The electro-optic sampling subsystem 40 may also include off-axis parabolic mirrors 50, 52. Parabolic mirrors 50, 52 may collect the terahertz radiation and focus it onto the crystal 45 used for detection, thus increasing detection efficiency. In lieu of the parabolic mirrors, lenses fabricated from appropriate materials, such as plastic, could be used.

The electro-optic sampling subsystem 40 may also include a balanced detector 46. This detector 46 may produce an output signal that is proportional to the difference in intensity between two light beams. Mirrors 54, 56, 57, 58, 59 may be a part of subsystem 40 and may be used to redirect the laser beam as illustrated.

The electro-optic sampling subsystem 40 may also include a lock-in amplifier 85. The amplifier may provide very sensitive detection of an electrical signal that matches the frequency and phase of the reference signal. The lock-in amplifier 85 may be used to isolate weak signals.

Photodiode (PD) 97 may produce an electrical signal that includes an electrical pulse for every light pulse produced by the mode-locked laser 10. This electrical pulse train may be used to synthesize the oscillating bias voltage applied to the sample 30 and the reference signal for the lock-in amplifier 85. Photodiode 97 may include an electrical amplifier. The signal produced by photodiode 97 may be a pulse train at the repetition rate ($f_{rep}$) of the mode-locked laser 10. The frequency spectrum of a pulse train may have spikes at integer multiples of $f_{rep}$. In the frequency domain, each spike may correspond to a sinusoidal signal at that frequency.

Power splitter 95 may split the output of the photodiode 97 into two signals.

Bandpass filter 90 may be used to pass a narrow band of frequencies. In this embodiment, bandpass filter is tuned to pass the spike at 3 $f_{rep}$ while blocking the others.

Direct digital synthesizer (DDS) 93 may be used to produce an electrical waveform. In the present embodiment, the direct digital synthesizer 93 is a simple device that only produces sinusoidal waves. It is used to produce a signal at frequency f, where $f = f_{rep} - f_{ref}$, that is synchronized to the pulse train produced by the mode-locked laser.

The bandpass filter 90 and direct digital synthesizer 93 may produce a signal at a frequency that is slightly different from the repetition rate of the laser (different by an amount $f_{ref}$) that will be applied to the sample 30. The THz produced by the sample may then be modulated at frequency $f_{ref}$, which may be convenient for implementing lock-in detection. Other variations on this bandpass filter 90 and synthesizer 93 implementation are possible. The signal applied to the sample could be at frequency $f_{rep}$, in which case the THz would not be modulated. A phase shifter could be used and the strength of the THz could be controlled by the phase shifter.

Power splitter 95 may split into two the signal produced by direct digital synthesizer 93. One signal may be used as input to an amplifier 83, the other portion of the split signal may be used to generate the reference signal for the lock-in amplifier 85.

Amplifier 83 may amplify the signal at frequency f prior to input to the tank circuit.

The terahertz generation system further includes a translation stage with pair of mirrors 86. This is stage may operate under computer control. The translation stage 86 may change the path length of the laser beam bouncing off of its mirrors. The change in path length may correspond to the change in delay of the optical pulses incident on the ZnTe crystal 45 for electro-optic sampling. This stage provides a pulse train for the electro-optic sampling that has a delay with respect to the pulses incident on the sample 30 and where that delay can be changed in the controlled manner. Alternate approaches to this stage 86 include using two mode-locked lasers with pulse trains that are synchronized to one another. One laser may illuminate the sample while the other laser may illuminate the detector crystal (ZnTe) 45.

A sample 30 used to generate THz may be a bulk semi-insulating (100) gallium arsenide wafer. A 100 nm thick layer of silicon oxide may be first evaporated on the sample surface as an insulating layer. Then gold electrodes 63, 65 may be patterned on top of the insulating layer using photolithography; the electrodes may be separated by about 100 microns (100 μm).

A radio frequency bias may be applied across the electrodes 63, 65. The bias may have a frequency f near the laser repetition rate where for this embodiment:

$$f_{rep} = 89 \text{ MHz}.$$

A resonant (LC) circuit 71 may enhance the bias across the electrodes 63, 65. The inductor (L≈1200 nanohenry (nH)) may be the secondary coil of an air-core transformer with about 22 turns of magnetic wire. The capacitor 75 (C≈3 picofarads (pF)) may be a sealed glass variable capacitor. The circuit 71 may be tuned by measuring voltage $V_{mon}$ across a turn of wire wrapped around the inductor 70. The voltage $V_{mon}$ may be proportional to the bias across the sample 30.

The LC circuit 71 may be driven using a 20 watt radio frequency power amplifier 80, which may produce an estimated 200 V amplitude bias. The impedance of the circuit 71 may be tuned to match the output of amplifier 80 by adjusting the position of the wires along the inductor 70.

The probe signal may be linear in the THz field. By modulating the THz field and measuring the THz signal using a lock-in amplifier 85, increased sensitivity and reduced background noise may be accomplished. This can be done using a mechanical chopper in the pump beam or by modulating the bias. In lieu of the resonant circuit 71, a higher power amplifier could be used.

Amplifier 83 may amplify the signal at frequency f prior to input to resonant circuit 71. A power splitter 73 may split the signal produced by direct digital synthesizer.

A heterodyne technique may be employed in the terahertz generation and detection system of the present disclosure. This technique may be used instead of a lock-in amplifier capable of detecting in the radio frequency f range since such amplifiers may not be as sensitive as lock-in amplifiers in the audio range.

For a time delay r between the pump 5 and the electro-optic sampling pulses, the THz field strength may be expressed as follows:

$$E(t) \propto V(t) I(t)$$

where $V(t) = \cos(2\pi f t)$ is the bias voltage and I(t) is the intensity of the pump laser pulse train. A large Fourier component exists at frequency f. The Fourier transform of I(t) may be represented as a comb with lines centered at $n f_{rep}$ where n is a whole number. The Fourier transform of E(t) may be shown with respect to t as a peak at $f - f_{rep}$ using a convolution theorem. This may lead to a modulation in the THz emission at $f - f_{ref}$ which can be detected using lock-in amplifier 85. The signal from the lock-in amplifier 85 may be the same amplitude as one using a sinusoidal bias at $f - f_{ref}$. The pulses of the pump 5 incident on sample 30 may effectively see a DC field modulated at $f_{ref}$. For the data taken here, $f_{ref} = 1$ kHz, a frequency that may be easily handled by a lock-in amplifier 85.

Direct digital synthesizer 90 may be used to synchronize f with $f_{rep}$ to minimize drift in $f_{ref}$ caused by temperature fluctuations and acoustic vibrations. Band pass filter 87, mixer 88 and low pass filter 89 may be used to produce the reference signal for lock-in amplifier 85. Band pass filter 87 may be used to filter out the spike at $f_{ref}$ from the signal produced by the photodiode 97.

At mixer 88 the two input signals, $f_{ref}$ and f, may be multiplied to produce an output signal of sine waves at frequencies $f_{ref} + f$ and $f_{ref} - f = f_{ref}$. The variable $f_{ref}$ may be selected at a relatively low frequency e.g., tens of kHz. The low pass filter 89 may pass the difference frequency $f_{ref}$ produced by the mixer 88 while blocking the sum frequency. Together, mixer 88 and low pass filter 89 may increase the strength of the electric field of the signal applied to the sample 30 as a bias.

Figure 1B:
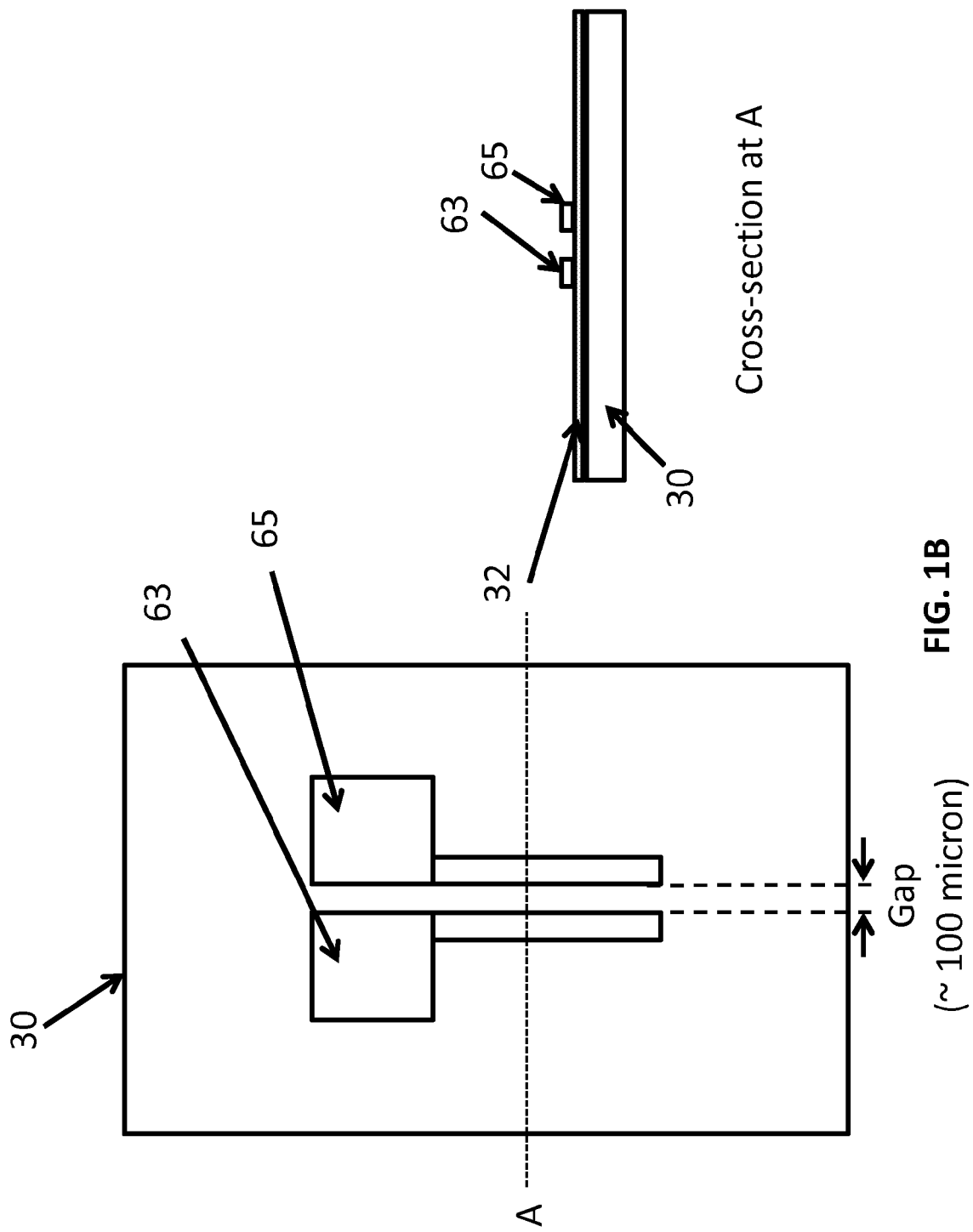
FIG. 1B is a photoconductor coated with an insulator in accordance with one embodiment of the present disclosure.

Referring now to FIG. 1B, illustrated is a photoconductor coated with an insulator in accordance with one embodiment of the present disclosure. The photoconductor 30 may be a gallium arsenide substrate coated with an insulator, e.g., silicon dioxide. At cross section A of FIG. 2, the insulator layer 32 is illustrated. In the present embodiment the gap between electrodes 63, 65 is about one hundred microns.

Figure 2:
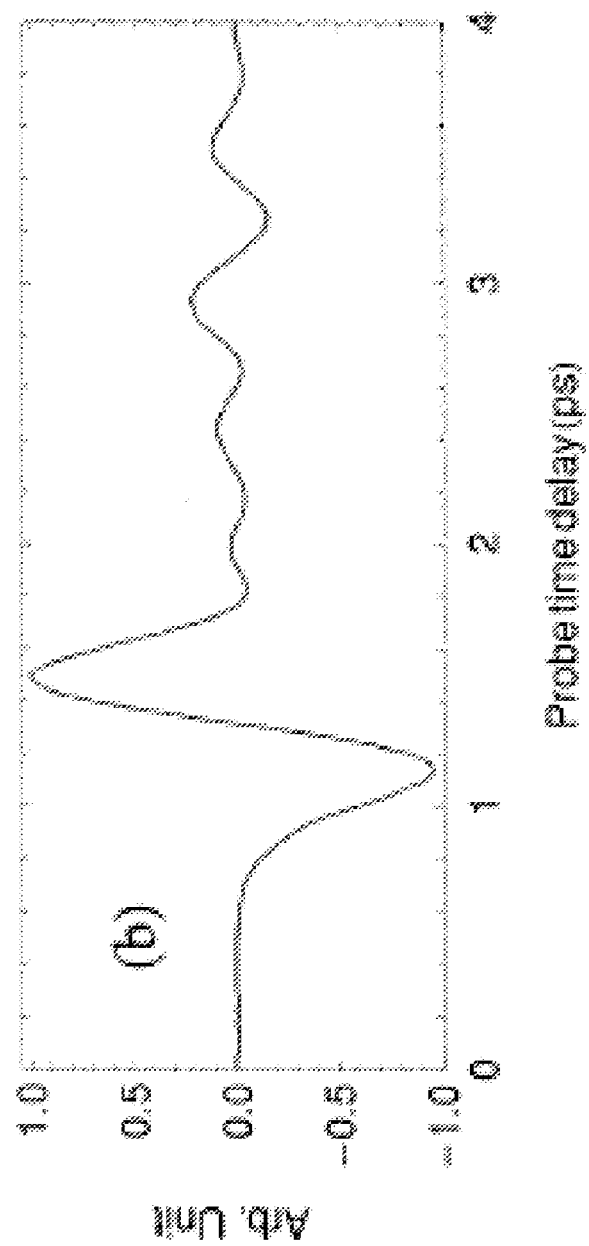
FIG. 2 is a typical terahertz trace produced by the system in FIG. 1A showing probe time delay in picoseconds.

Referring now to FIG. 2, illustrated is a typical THz trace. Using the terahertz generation and detection system of the present disclosure, a peak THz field of forty-five (45) V/cm may be found for an input power of about two hundred milliwatts (200 mW). The maximum THz signal may be found for a large spot, on the order of forty-five (45) microns.

Figure 3:
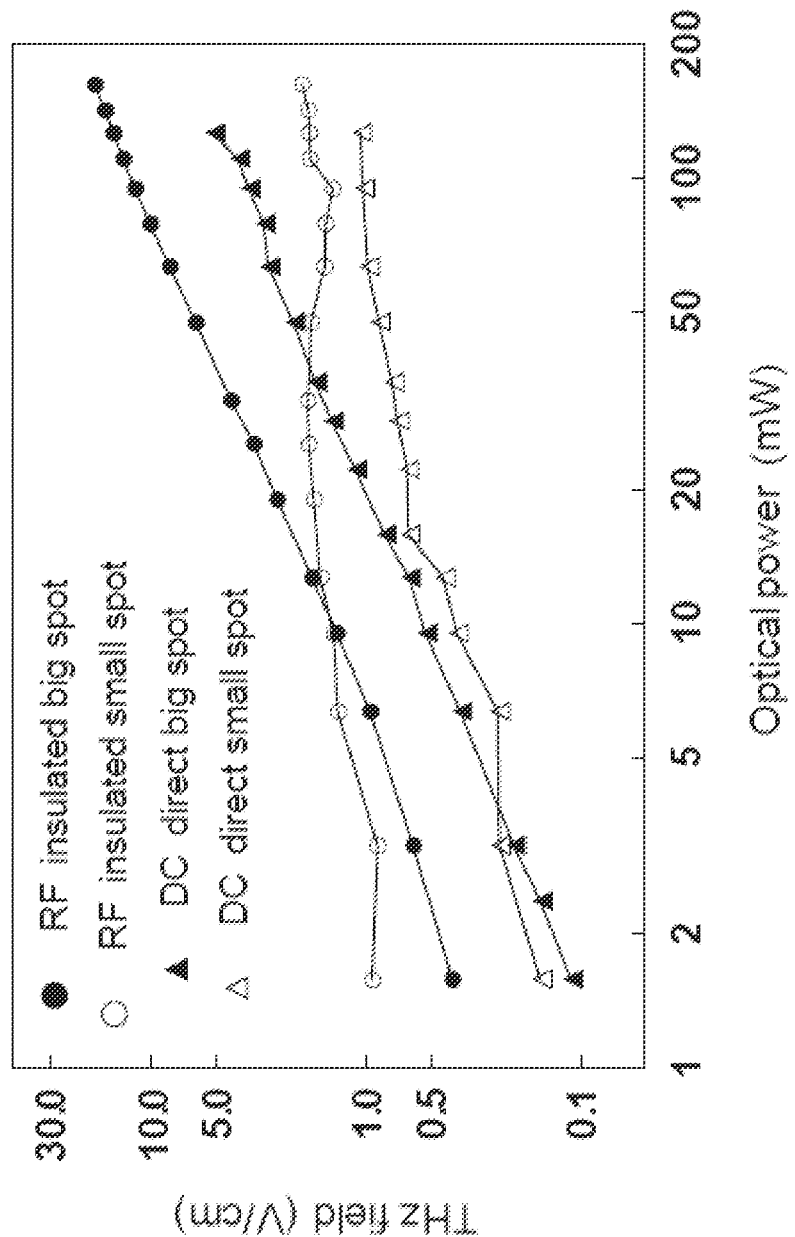
FIG. 3 is a peak THz field measured as it depends on optical power for various excitation voltages in accordance with one embodiment of the present disclosure.

Referring now to FIG. 3, the dependence of the THz field may be measured on the optical power and the bias voltage. For a large spot (~45 microns), represented by filled circles in FIG. 3, a steadily increasing THz field may be seen. On the other hand, for a small spot (~5 microns), represented by empty circles in FIG. 3, saturation behavior may be seen.

Figure 4:
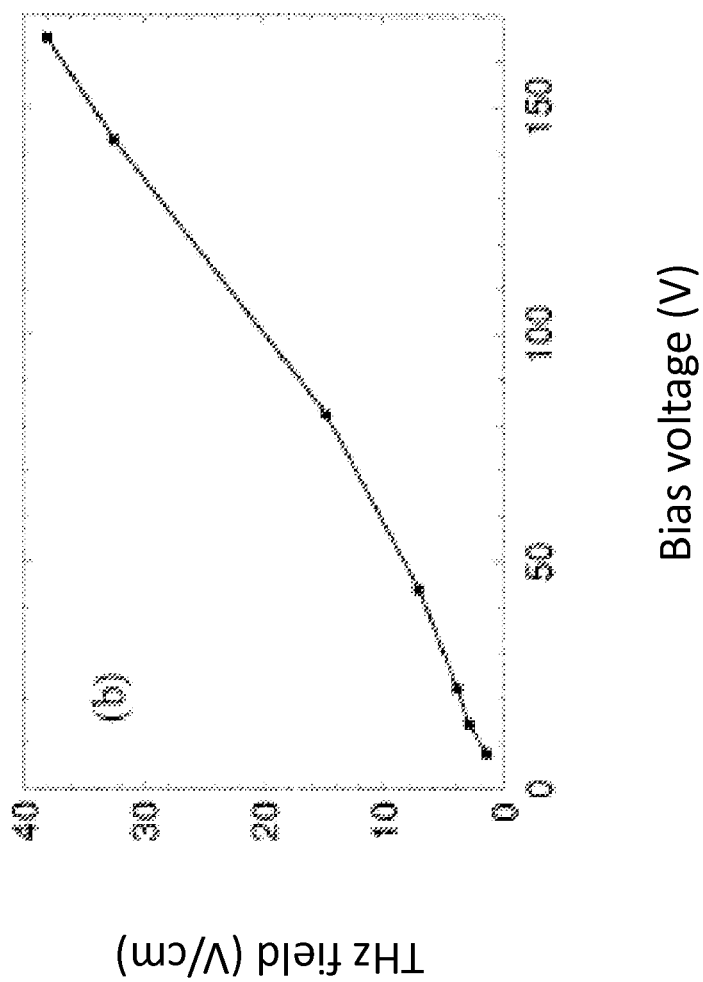
FIG. 4 is a peak THz field measured as it depends on bias voltage in accordance with one embodiment of the present disclosure.

Referring now to FIG. 4, the bias voltage dependence may show a linear dependence, with no signs of saturation over the accessible range of radio frequency powers.

Emitters with insulated electrodes may be compared with emitters having an identical electrode pattern, but with no silicon dioxide insulating layer. With a radio frequency bias, direct contact samples may show a similar power and bias dependence. However, direct contact samples may be susceptible to failure at the highest optical power and largest bias. Examination under a microscope may show damage where the laser was focused or at the corners of the electrodes.

A DC bias of 40V may result in a smaller THz field. This may be because the THz was emitted only from the region of the sample located near the electrodes. The DC bias samples may also show susceptibility to failure.

Figure 5:
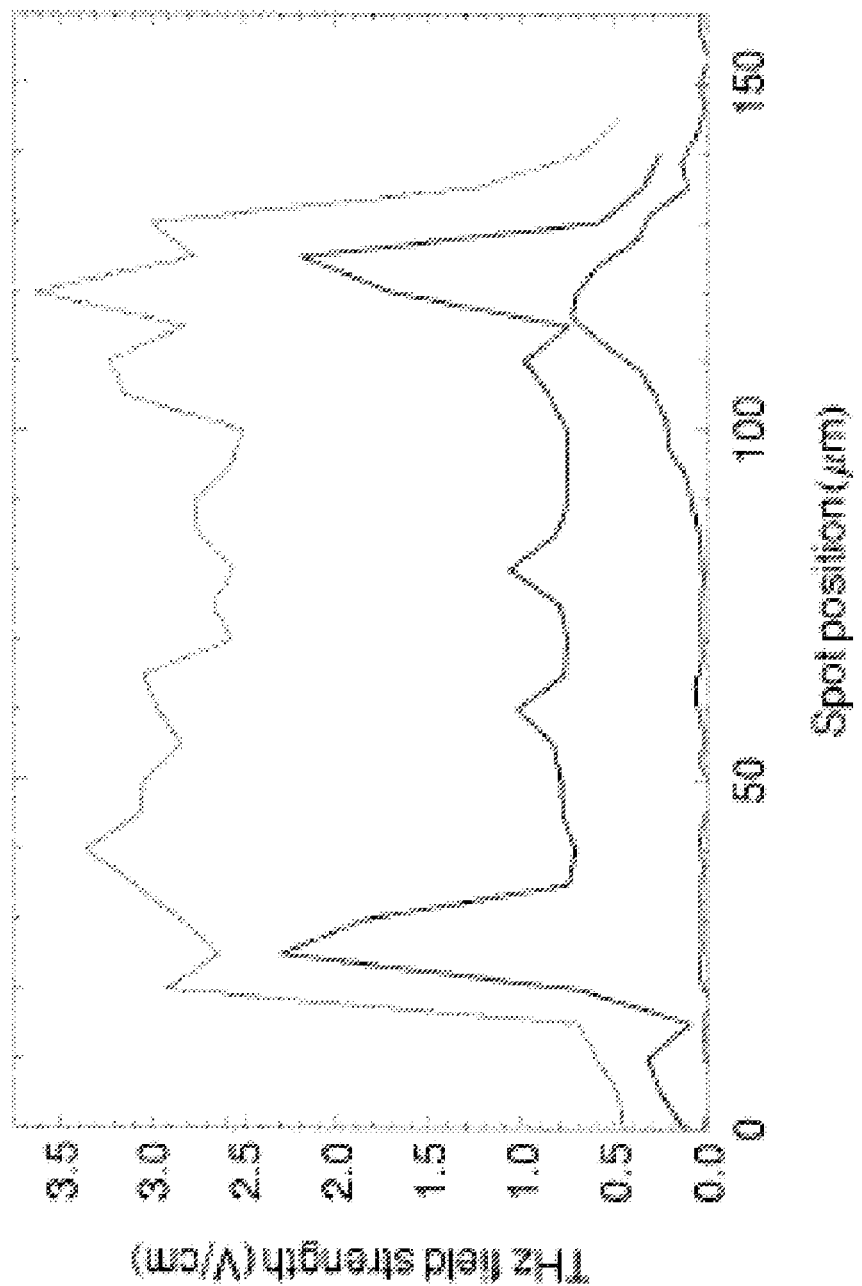
FIG. 5 is a plot of the observed peak THz field as a function of the spot position in accordance with one embodiment of the present disclosure.

Referring now to FIG. 5, illustrated is the observed peak THz field as a function of spot position in accordance with one embodiment of the present disclosure. This graph shows the dependence of the signal on the position of the spot of five (5) microns width. When the emitter of the present disclosure having an insulated radio frequency bias is compared to an emitter with direct contacts with a DC bias of forty volts (40V), it may be seen that the emitter with the radio frequency bias has a more uniform field distribution. The emission from the emitter with the radio frequency bias may peak near the electrodes at low optical power but may be very uniform at high optical power. Emitters with direct contacts may show trap-enhanced fields effect, with THz emission peaking near the edges.

The present disclosure provides terahertz generation that incorporates biased photoconductive THz emitters which use a rapidly oscillating bias near the laser repetition rate. An advantage over photoconductive switches using trap-enhanced fields may be in spreading the electric field over a wider area. Unlike interdigitated structures, this spreading of the electric field allows use of a larger excitation area that is not partially occluded by electrodes. No specially patterned sample is required, either. However, using electrodes patterns on the surface with a thin insulating layer between may be desirable.

The present system uses a passive resonant (LC) circuit to produce the radio frequency high voltage. It does not require active high voltage electronics, which can produce electrical pickup. Using the present system, the bias field can be modulated at the repetition rate, leading to an effectively constant train of THz pulses. A mechanical chopper may be used to test the modulation of the pump beam. Bias fields of 30 kV/cm or less may be desirable with the present system. However, this may be increased through different enhancement circuits. The present system could also be an alternative to amplified mode-locked lasers.

Figure 6:
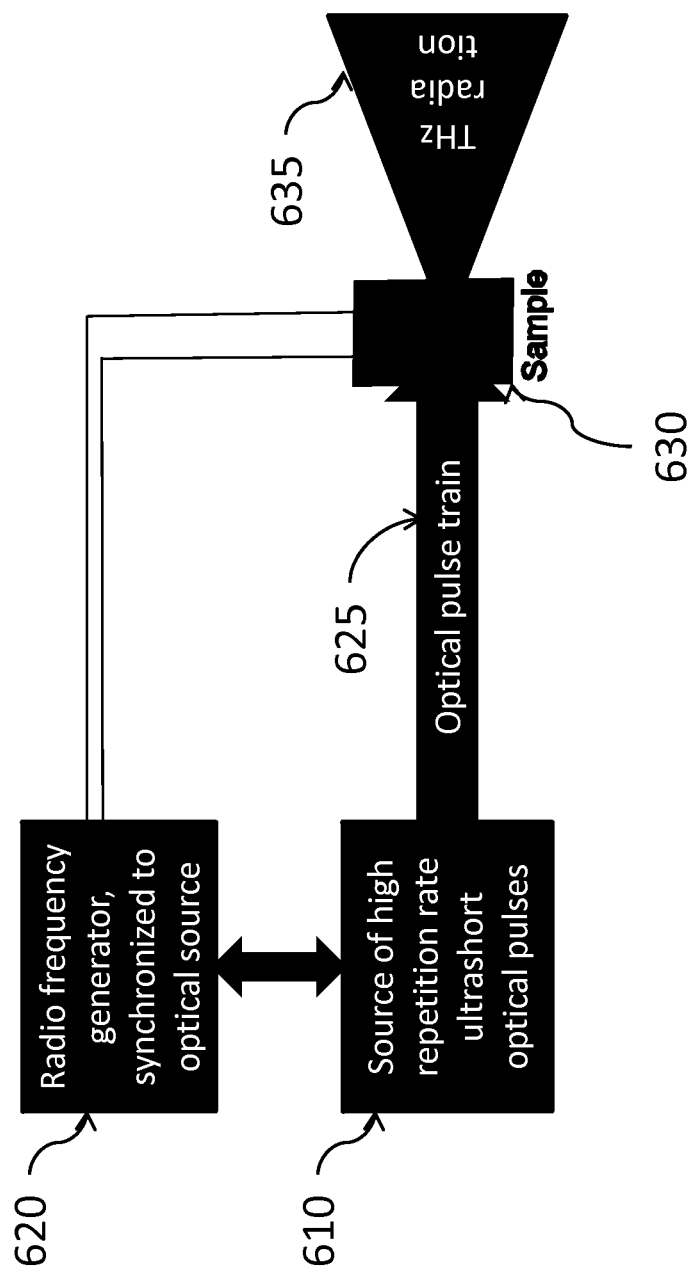
FIG. 6 is a simplified terahertz generation system in accordance with another embodiment of the present disclosure.

Referring now to FIG. 6, illustrated is a more simplistic terahertz generation system in accordance with another embodiment of the present disclosure. The system includes an ultrafast optical pulse source 610. For purposes of the present disclosure, the ultrafast optical pulse source 610 should generate optical pulses having a duration between about ten picoseconds and ten femtoseconds, the pulses further having a repetition rate of about one megahertz or higher. The duration influences the bandwidth of generated THz. Accordingly, the duration may be short enough to generate significant power at the desired THz frequency. The repetition rate may be above the inverse of the screening time in the sample. The wavelength of the optical pulses may be consistent with the photoconductor used in the sample, for example if gallium arsenide (GaAs) is used as the photoconductor, then the wavelength must be shorter than 870 nm, which is the bandgap of GaAs. Longer wavelengths may not be absorbed.

The simplified system further includes a radio-frequency generator 620. An oscillating electric field, the bias, may be applied to the sample using electrodes that may be insulated from the sample 630. This bias may be synchronized to the optical pulse train of optical pulse source 610. The bias could be at the same frequency as the repetition rate of the pulse source, or it could be at a different frequency to provide a modulation of the THz signal at the difference between the bias frequency and the repetition rate. The generation of the radio frequency bias may occur in a number of ways. For example, it may occur by detecting a small portion of the output pulse train 625 and using it as the clock to a synthesizer (digital or analog). Alternatively, the radio frequency generator 620 can be free-running and the frequency and phase of the optical pulse source can be controlled to achieve synchronization. If modulated THz radiation is desired, both the ultrafast optical pulse source 610 and the radio-frequency generator can be free running and a reference signal providing the frequency and phase of the modulation can be produced electronically from their outputs.

The simplified system further includes a sample 630. In the present embodiment, THz radiation emission 635 is actually produced by the flow of electrons in a photoconductor sample 630. The electrons may be generated by excitation by the ultrashort optical pulse train. They flow because of the applied electric field, the bias. The bias electric field is produced by a pair of electrodes with a narrow gap between them. The electrodes may be insulated from the photoconductor 630.

While the specification describes particular embodiments of the present invention, those of ordinary skill can devise variations of the present invention without departing from the inventive concept.

We claim:

1. A terahertz generation system, comprising:
   an ultrafast optical pulse source configured to generate a train of ultrafast optical pulses;
   a photoconductor configured to receive the optical pulses from the ultrafast optical pulse source and to generate a terahertz frequency pulse; and
   a radio frequency generator configured to apply an electric field to the photoconductor via electrodes, said electrodes being insulated from the photoconductor.

2. The terahertz generation system of claim 1 wherein the ultrafast optical pulse source includes a mode-locked laser and a pump.

3. The terahertz generation system of claim 2 wherein the mode-locked laser is a Titanium doped sapphire laser.

4. The terahertz generation system of claim 2 wherein the mode-locked laser uses an optical fiber doped with a rare earth element.

5. The terahertz generation system of claim 4 wherein the rare earth element is erbium.

6. The terahertz generation system of claim 1 wherein the ultrafast optical pulse source includes a mode-locked diode laser.

7. The terahertz generation system of claim 1, further comprising:
   a resonant circuit configured to enhance a signal at frequency f for application to the photoconductor as a bias.

8. The terahertz generation system of claim 1, wherein the photoconductor is composed of gallium arsenide.

9. The terahertz generation system of claim 1, further comprising:
   a direct digital synthesizer device; and
   a bandpass filter device,
   wherein both the synthesizer device and the bandpass filter device are configured to produce a signal at frequency that is different from the repetition rate of the laser by an amount $f_{ref}$ that is applied to the photoconductor, such that the terahertz generated by the photoconductor is modulated at frequency $f_{ref}$.

10. The terahertz generation system of claim 1, further comprising;
    an electro-optical detection subsystem that includes a electro-optic device configured to measure the emitted terahertz frequency pulse.

11. The terahertz generation system of claim 10, wherein the electro-optic device is a zinc telluride crystal.

12. A terahertz generation method, comprising:
    generating a train of ultrafast optical pulses from an ultrafast optical pulse source;
    receiving the optical pulses from the ultrafast optical pulse source and generating terahertz frequency pulses with a photoconductor; and
    applying, by a radio frequency generator, an electric field to a photoconductor via electrodes, said electrodes being insulated from the photoconductor.

13. The terahertz generation method of claim 12 wherein the ultrafast optical pulse source includes a mode-locked laser and a pump.

14. The terahertz generation method of claim 13 wherein the mode-locked laser is a Titanium doped sapphire laser.

15. The terahertz generation method of claim 13 wherein the mode-locked laser uses an optical fiber doped with a rare earth element.

16. The terahertz generation method of claim 13 wherein the rare earth element is erbium.

17. The terahertz generation method of claim 12 wherein the ultrafast optical pulse source includes a mode-locked diode laser.

18. The terahertz generation method of claim 12, further comprising:
   enhancing a signal at frequency f for application to the photoconductor as a bias with a resonant circuit.

19. The terahertz generation method of claim 12, wherein the photoconductor is composed of gallium arsenide.

20. The terahertz generation method of claim 12, further comprising:
   producing a signal at a frequency that is different from the repetition rate of the laser by an amount $f_{ref}$ that is applied to the photoconductor, such that the terahertz generated by the photoconductor is modulated at frequency $f_{ref}$.

21. The terahertz generation method of claim 12, further comprising;
   measuring the emitted terahertz frequency pulse with an electro-optic device.

22. The terahertz generation method of claim 21, wherein the electro-optic device is a zinc telluride crystal.

* * * * *